(12) United States Patent
Adeeb

(10) Patent No.: US 10,520,384 B2
(45) Date of Patent: Dec. 31, 2019

(54) ACCUMULATOR PRESSURE MONITORING SYSTEM

(71) Applicant: Caterpillar SARL, Geneva (CH)

(72) Inventor: Adam Adeeb, Seaham (GB)

(73) Assignee: Caterpillar SARL, Geneva (CH)

( * ) Notice: Subject to any disclaimer, the term of this patent is extended or adjusted under 35 U.S.C. 154(b) by 145 days.

(21) Appl. No.: 15/787,953

(22) Filed: Oct. 19, 2017

(65) Prior Publication Data

US 2018/0120185 A1 May 3, 2018

(30) Foreign Application Priority Data

Oct. 31, 2016 (GB) .................................. 1618367.5

(51) Int. Cl.
*G01L 19/06* (2006.01)
(52) U.S. Cl.
CPC ................................ *G01L 19/0618* (2013.01)
(58) Field of Classification Search
CPC .................................................. G01L 19/0618
USPC .......................................................... 73/714
See application file for complete search history.

(56) References Cited

U.S. PATENT DOCUMENTS

| 4,784,182 A | 11/1988 | Sigimura |
| 5,128,093 A * | 7/1992 | Ose .......................... G21C 7/16 376/219 |
| 5,240,379 A | 8/1993 | Takashi et al. |
| 5,630,316 A | 5/1997 | Itsuji et al. |
| 8,833,143 B2 | 9/2014 | Chen et al. |
| 9,804,039 B2 * | 10/2017 | Reyes, III ............... E21B 34/16 |
| 2014/0060030 A1 * | 3/2014 | Ma .......................... E02F 9/123 60/413 |
| 2016/0027225 A1 | 1/2016 | Fazeli et al. |

FOREIGN PATENT DOCUMENTS

| DE | 10143830 A1 | 3/2003 |
| EP | 2905479 A1 | 8/2015 |
| WO | 2014/036232 A1 | 3/2014 |

\* cited by examiner

*Primary Examiner* — Tarun Sinha

(57) ABSTRACT

An accumulator pressure monitoring system for monitoring pressure in a hydraulic circuit. The accumulator includes a first chamber filled with a gas, a second chamber filled with a liquid and a movable separator disposed between the first and second chambers. A pressure sensor measures the pressure in the first chamber; and a control unit receives pressure readings from the pressure sensor and compares the pressure readings to threshold pressure values and may control the accumulator based upon this comparison.

15 Claims, 4 Drawing Sheets

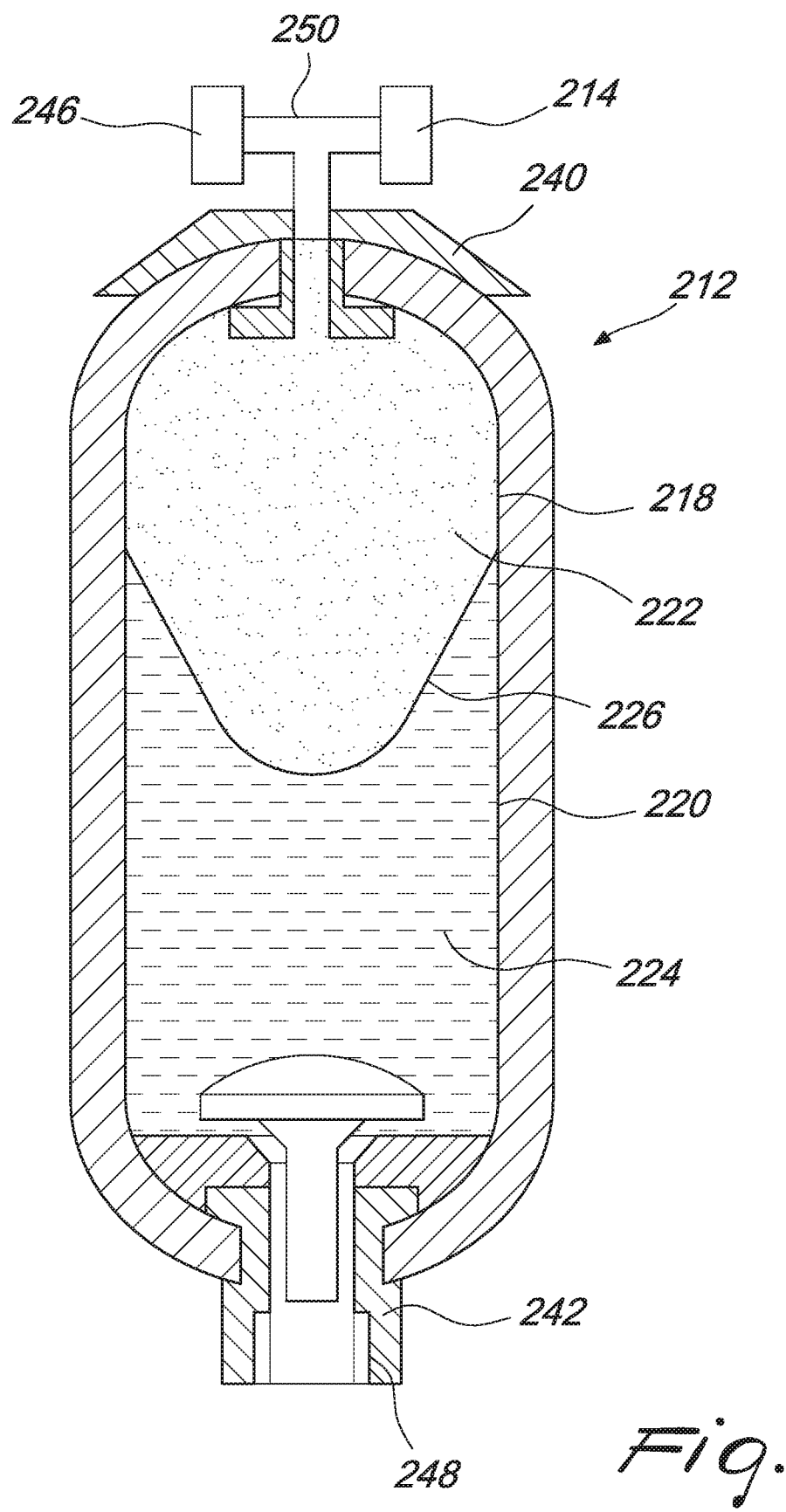

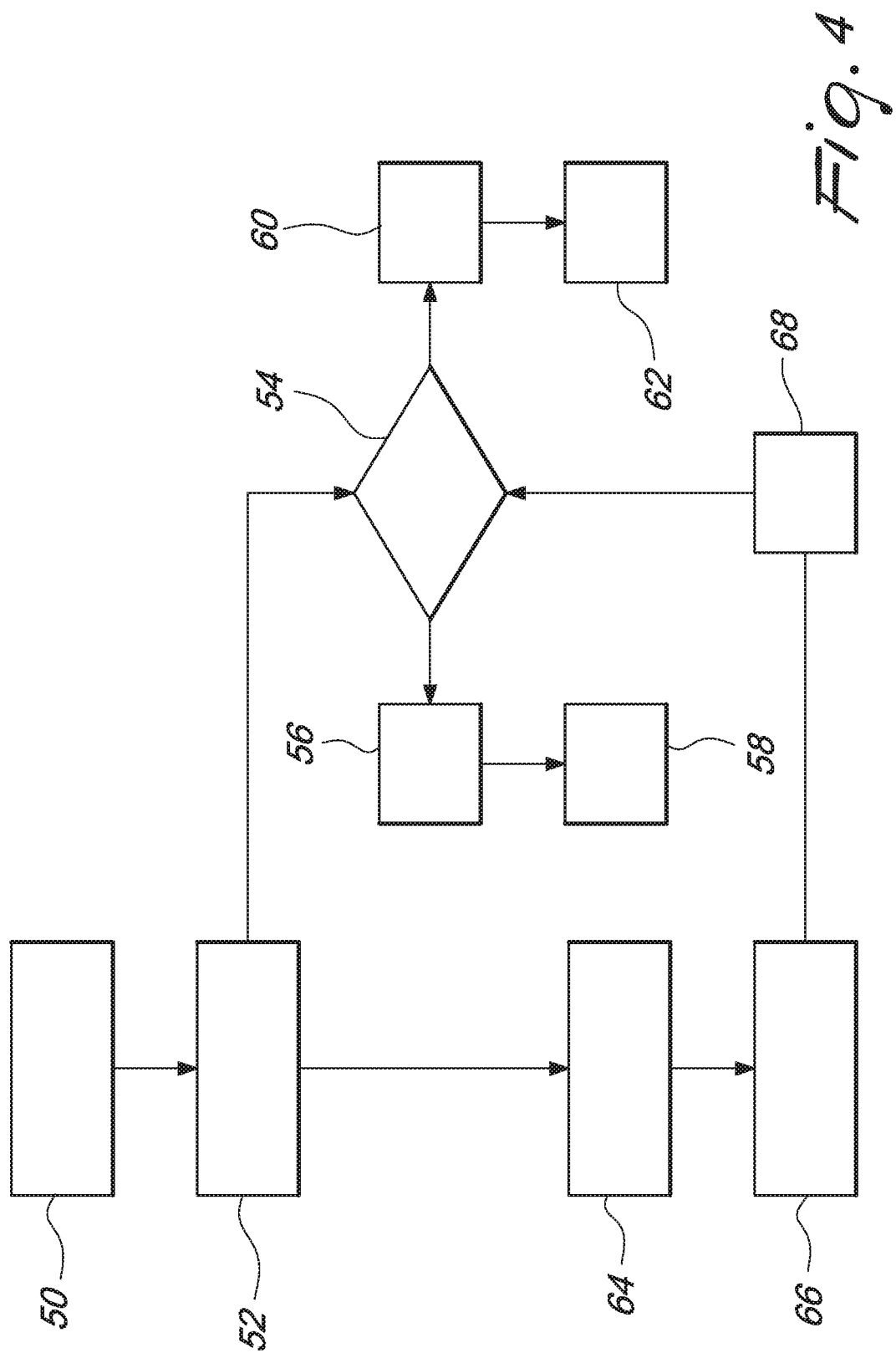

ACCUMULATOR PRESSURE MONITORING SYSTEM

TECHNICAL FIELD

This disclosure relates generally to the field of hydraulic accumulators and particularly to determining pressure of the hydraulic accumulator connected to a hydraulic system, such as a hydraulic braking and/or steering system.

BACKGROUND

A hydraulic accumulator is an energy storage reservoir that may have a non-compressible hydraulic fluid. The non-compressible hydraulic fluid may be held under pressure. The pressure may be applied by a source such as a spring, a raised weight, or a compressed gas. In a hydraulic accumulator using compressed gas, the capacity to maintain gas pressure may need to be regularly inspected to ensure operational effectiveness of the accumulator. Overtime, the gas may leak, primarily due to worn or degraded structures or seals within the accumulator or any external environment effects. Further, there may be leakages on the hydraulic fluid circuit leading to a loss in pressure in the system during operation.

Typical solutions for monitoring operational hydraulic oil capacity of an accumulator may require a pressure sensor being positioned so as to detect pressure loss or pressure changes. Signal may be sent by the pressure sensor to a controller in order to detect any abnormal pressure conditions. The pressure sensor may be added to a warning circuit in order to provide a warning system to the operators in case of a hydraulic component/system failures or leaks which result in low oil pressures. The pressure sensor may be added to the oil side of the accumulator circuit. A second sensor may be added to the gas side of the accumulator to measure the gas pressure, if gas side pressure detection is required.

U.S. Pat. No. 5,240,379 discloses a hydraulic power unit for a vehicle that comprises a pump driven by a motor to pump up an oil stored in an oil tank, a gas filling type accumulator connected to the pump, a pressure sensor disposed at a portion near an outlet port of the accumulator for detecting a pressure of the oil in the accumulator. A control unit operatively connected to the pressure sensor and a relay operatively connected to the control unit for controlling an operation of the motor.

US2013247999 discloses a system including a hydraulic accumulator, a pressure sensor, a fluid source and a data processor to detect a pre-charge pressure. The hydraulic accumulator includes first and second fluid chambers and a separator therebetween. The pressure sensor is connected to the first fluid chamber. The second fluid chamber is filled with a compressible fluid. The data processor is connected to the pressure sensor and is configured to determine a first and second rate of pressure changes, and a transition pressure between the first and second rates. The approximate pre-charge pressure is determined based on the transition pressure.

The present disclosure is directed, at least in part, to improving or overcoming one or more aspects of the prior art system.

BRIEF SUMMARY OF THE INVENTION

In a first aspect, the present disclosure describes an accumulator pressure monitoring system. The accumulator comprises an accumulator having a first chamber filled with a gas, a second chamber filled with a liquid and a movable separator disposed between the first and second chambers; a pressure sensor coupled to the first chamber; and a control unit operatively connected to the pressure sensor, the control unit configured to receive pressure readings from the pressure sensor and to compare the pressure readings to threshold pressure values.

In a second aspect, the present disclosure describes a method to detect abnormal pressure conditions in an accumulator. The method comprises the steps of measuring a pressure of a gas in a first chamber of the accumulator, the first chamber being separated from a second chamber by a movable separator disposed between the first chamber and the second chamber, the second chamber being filled with a liquid; providing the pressure reading of the gas to a control unit; and comparing the pressure readings with threshold pressure values.

BRIEF DESCRIPTION OF THE DRAWINGS

The foregoing and other features and advantages of the present disclosure will be more fully understood from the following description of various embodiments, when read together with the accompanying drawings, in which:

FIG. 3 is a schematic drawing of an accumulator with a pressure sensor in a second embodiment according to the present disclosure; and FIG. 4 is a flowchart for detecting an abnormal pressure condition in an accumulator according to the present disclosure.

DETAILED DESCRIPTION

This disclosure generally relates to an accumulator pressure monitoring system. The accumulator pressure monitoring system may monitor and measure pressure levels within an accumulator circuit.

Figure 1:
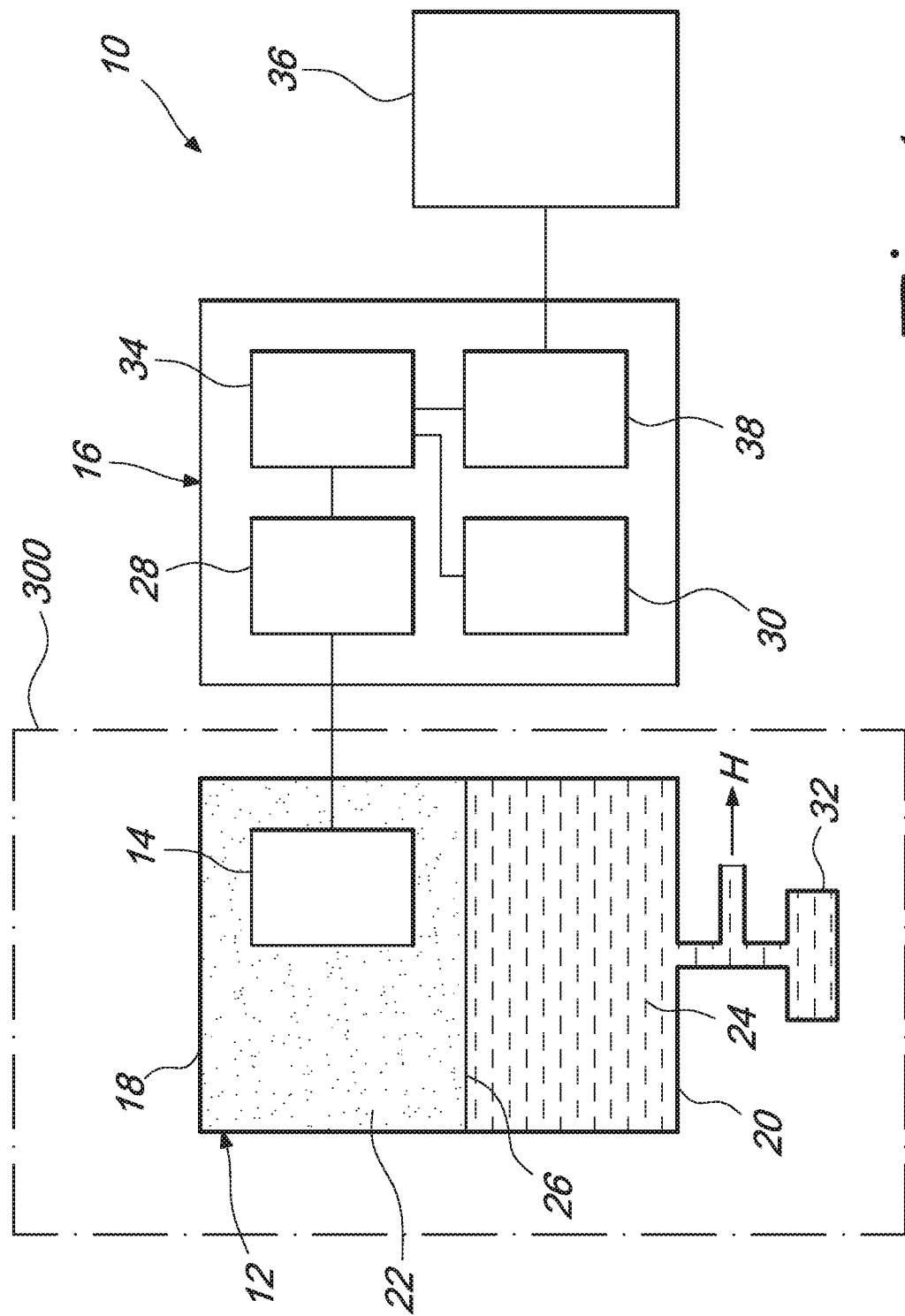
FIG. 1 is a block diagram of an accumulator pressure monitoring system according to the present disclosure.

FIG. 1 illustrates an accumulator pressure monitoring system 10. The accumulator pressure monitoring system 10 comprises an accumulator 12, a pressure sensor 14 and a control unit 16. Accumulator 12 may be a hydraulic accumulator. The pressure sensor 14 may be positioned as to measure pressure levels in the accumulator 12. Pressure sensor 14 may be disposed in the accumulator 12.

Accumulator 12 may have a first chamber 18 and a second chamber 20. The first chamber 18 may be filled with a compressible first fluid 22. In an embodiment, the compressible first fluid 22 may be a gas or any other compressible fluid. The second chamber 20 may be filled with a second fluid 24. In an embodiment, the second fluid 24 may be selected from a group consisting of oil, lubricating fluid, or any other fluid associated with hydraulic machinery.

A separator 26 may be disposed between the first and second chambers 18, 20. The separator 26 may be configured to separate the first and second chambers 18, 20. The separator 26 may keep the compressible first fluid 22 contained in the first chamber 18 and the second fluid 24 contained in the second chamber 20. Separator 26 may keep the compressible first fluid 22 separated from the second fluid 24.

The separator 26 may be movable. In an embodiment, the entire separator 26 may be displaceable between a first position and a second position. In a further embodiment, a portion of the separator 26 may be displaceable between a first position and a second position.

Accumulator 12 may have valves (not shown) to selectively control flow of the first and second fluids 22, 24 into and out of the accumulator 12. Valves may control the charging and discharging of the first and second fluids 22, 24 under pressure.

The pressure sensor 14 may be coupled to the first chamber 18. In an embodiment, pressure sensor 14 may be connected to the first chamber 18. In a further embodiment, pressure sensor 14 may be connected either upstream or downstream of the first chamber 18.

In an embodiment, pressure sensor 14 may monitor pressure levels either prior to charging and discharging of the second chamber 20 or after charging and discharging of the second chamber 20. In a further embodiment, pressure sensor 14 may monitor pressure levels during charging and/or discharging of the second chamber 20.

The second chamber 20 may be connected to a second fluid source 32, such as a pump. The pump 32 may be a fixed or variable displacement compressible fluid pump. The second chamber 20 may be further connected so as to supply the second fluid to the second fluid circuit such as a hydraulic fluid circuit H such as brake systems, steering systems and other hydraulically driven systems. The flow of the second fluid 24 to the hydraulic fluid circuit H may be controlled by valves. The discharge of the second fluid 24 from the second chamber 20 may be determined by operation of the hydraulic fluid circuit H.

Pressure sensor 14 may be configured to provide pressure readings to the control unit 16. Pressure sensor 14 may provide pressure readings of the compressible first fluid 22 in the first chamber 18. The pressure readings of the compressible first fluid 22 in the first chamber 18 may be indicative of the pressure of the second fluid 24 in the second chamber 20.

Pressure sensor 14 may be configured to provide a pressure reading upon command by the control unit 16. Pressure sensor 14 may be configured to provide pressure readings either continuously or after pre-determined intervals of time. In an embodiment, the pressure sensor 14 may be a gas or a compressible fluid pressure sensor.

The control unit 16 may be operatively connected to the pressure sensor 14. The control unit 16 may be configured to receive a pressure reading from the pressure sensor 14. Control unit 16 may be configured to receive and process the pressure reading taken by the pressure sensor 14. Control unit 16 may be configured to compare the pressure reading to a threshold pressure value. In an embodiment, control unit 16 may be configured to compare a plurality of pressure readings to a threshold pressure value.

Control unit 16 may comprise a pressure module 28. Pressure module 28 may be configured to receive a pressure reading from the pressure sensor 14. Control unit 16 may further comprise a comparator 34. Comparator 34 may be configured to detect an abnormal pressure condition in the accumulator 12. The comparator 34 may compare the pressure reading with the threshold pressure value to detect an abnormal pressure condition. The comparator 34 may compare the pressure reading with the threshold pressure value to detect an abnormal pressure condition in either the first chamber 18 or the second chamber 20. In an embodiment, an abnormal pressure condition may be present when the pressure reading is below the threshold pressure value. In a further embodiment, an abnormal pressure condition may be present when the pressure reading is above a threshold pressure value.

The threshold pressure value may be stored in a memory module 30. In an embodiment, memory module 30 may store a plurality of threshold pressure values that are associated to various operating conditions. In an embodiment, memory module 30 may store at least one threshold pressure value for pressure in the first chamber 18 prior to activation of the pump 32 for the second fluid 24. The threshold pressure value is indicative of the operational health of the accumulator 12.

In a further embodiment, memory module 30 may store at least one threshold pressure value for pressure in the first chamber 18 after activation of the pump 32 for the continuous monitoring of the second fluid 24 pressure during operation. The memory module 30 may store a plurality of threshold pressure values for pressure in a first chamber 18 after activation of the pump 32 for the second fluid 24.

The threshold pressure value for pressure in the first chamber 18 prior to activation of the pump 32 may be different to the threshold pressure value for pressure in the first chamber 18 after activation of the pump 32. The threshold pressure value for pressure in the first chamber 18 prior to activation of the pump 32 may have a lower value relative to the threshold pressure value for pressure in the first chamber 18 after activation of the pump 32.

In yet a further embodiment, the comparator 34 may store pressure readings from the pressure sensor 14 in the memory module 30.

In yet a further embodiment, the memory module 30 may store pressure values for a first and a second pressure values. An abnormal pressure condition may be present when the pressure reading is below a first threshold pressure value. An abnormal pressure condition may be present when the pressure reading is above a second threshold pressure value. The first pressure value may be lower than a second pressure value. First pressure value may be a lower limit and the second pressure value may be an upper limit of a range of threshold pressure values.

The accumulator pressure monitoring system 10 may further comprise a warning device 36. Warning device 36 may be configured to emit an alert signal. The alert signal may be a sound signal or a light signal or both sound and light signals. In an embodiment, the warning device 36 may be configured to issue a different alert signal relative to the state of activation of the pump 32. The alert signal prior to activation of the pump 32 may be different to the alert signal after the activation of the pump 32. The warning device 36 may be operatively connected to the control unit 16. The control unit 16 may be configured to send a signal to the warning device 36 upon detection of an abnormal pressure condition.

Control unit 16 may have a warning module 38. Warning module 38 may be triggered to send a signal to the warning device 36. Comparator 34 may be configured to trigger the warning module 30 to send the signal upon detection of an abnormal pressure condition in the accumulator 12.

In an embodiment, a plurality of warning devices 36 may be provided. Each warning device 36 may be configured to issue a different alert signal relative to the state of activation of the pump 32. The alert signal prior to activation of the pump 32 may be different to the alert signal after the activation of the pump 32. Control unit 16 may have a plurality of warning modules 38 for each warning device 36.

Figure 2:
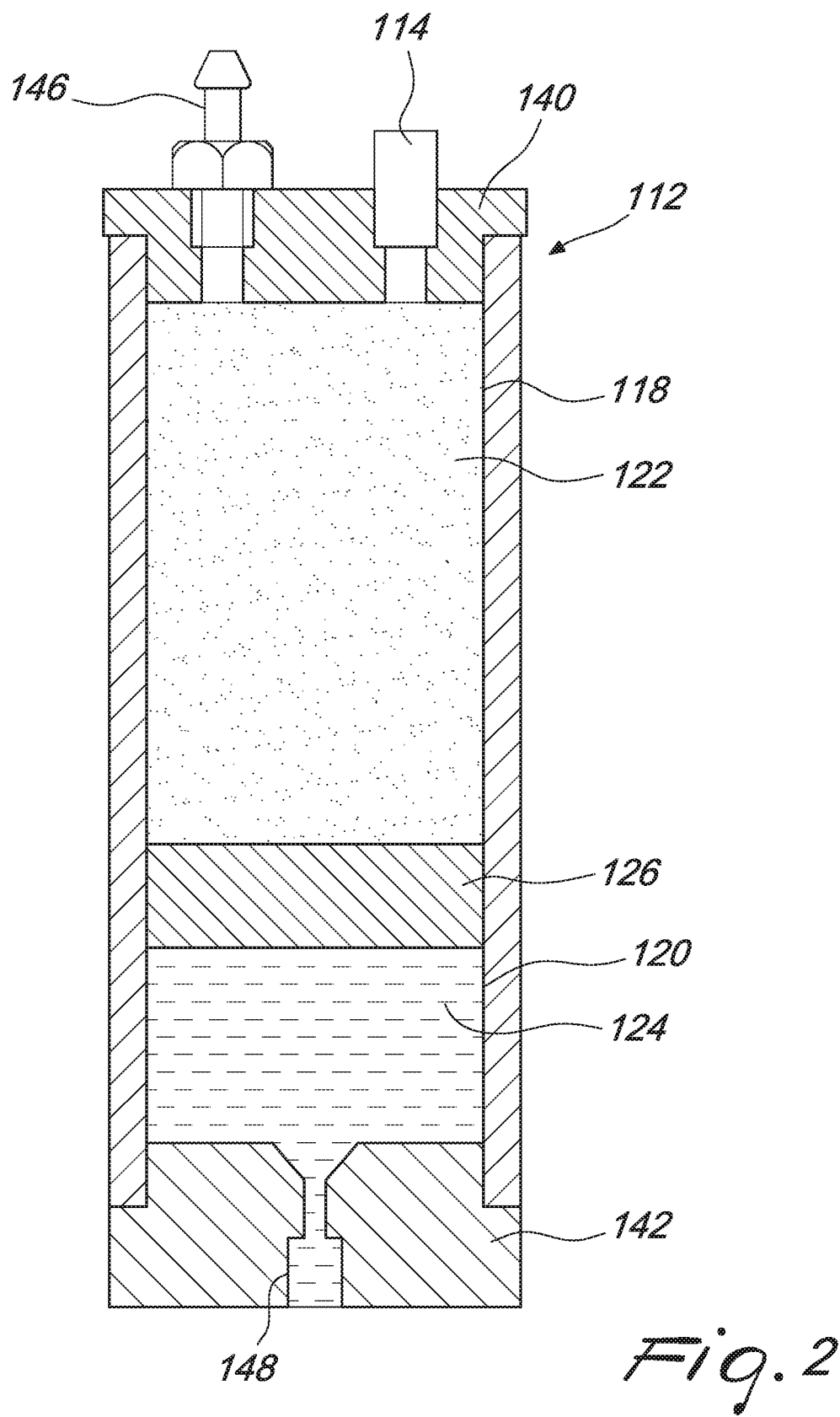
FIG. 2 is a schematic drawing of an accumulator with a pressure sensor in a first embodiment according to the present disclosure.

FIG. 2 illustrates a first embodiment of an accumulator 112 with a pressure sensor 114. The accumulator 12 is a piston accumulator 112. The piston accumulator 112 may comprise a first end cap 140 associated with the first chamber 118 and a second end cap 142 associated with the second chamber 120. First end cap 140 may have a charging valve 146 that is connected to the compressible fluid supply (not shown).

The movable separator 26 in the piston accumulator 112 may be a piston 126. The piston 126 may have seals (not shown) to reduce the risk of fluid moving between the first and second chambers 118, 120. The pressure sensor 114 may be positioned on the first end cap 140. Pressure sensor 114 may be positioned to measure the pressure of the first fluid 122 in the first chamber 118.

Expansion of volume of the second chamber 120 may result in a reduction of volume of the first chamber 118 thereby resulting in the increase of pressure in the first fluid 122. The volume of the second chamber 120 may increase by forced flow of the second fluid 124 into the second chamber 120.

FIG. 3 illustrates a second embodiment of an accumulator 212 with a pressure sensor 214. The accumulator 12 is a bladder accumulator 212. The bladder accumulator 212 may comprise a first end cap 240 associated with the first chamber 218 and a second end cap 242 associated with the second chamber 220. First end cap 240 may have a charging valve 246 that is connected to the compressible fluid supply (not shown). In an embodiment, charging valve 246 may be connected to the bladder accumulator 212 through a charging line 250 that is also connected to the compressible fluid supply (not shown).

The movable separator 26 in the bladder accumulator 212 may be a bladder 226. The bladder 226 may be flexible membrane that is movable between an expanded configuration and a compressed configuration. Bladder 226 may be attached to the internal wall of the bladder accumulator 212. In an embodiment, the pressure sensor 214 may be connected to the charging line 250. In a further embodiment, the pressure sensor 214 may be positioned on the first end cap 240.

Pressure sensor 214 may be positioned to measure the pressure of the compressible first fluid 222 in the first chamber 118. Expansion of volume of the second chamber 220 may result in a reduction of volume of the first chamber 218 thereby resulting in the increase of pressure in the first fluid 222. The volume of the second chamber 220 may increase by forced flow of the second fluid 224 into the second chamber 220.

With reference to FIG. 1, a machine 300 may comprise the accumulator pressure monitoring system 10. The machine 300 may be selected from a group consisting of excavators, wheel loaders, tractors and other machinery.

FIG. 4 illustrates a method to detect an abnormal pressure condition in the accumulator 12, 112, 112. The method may comprise a step 50 of measuring a pressure of a compressible first fluid 22, 122, 222 in a first chamber 18, 118, 218 of the accumulator 12, 112, 112. The first fluid 22, 122, 222 may be a gas. The first chamber 18, 118, 218 is separated from a second chamber 20, 120, 220 by a movable separator 26, 126, 226 disposed between the first chamber 18, 118, 218 and the second chamber 20, 120, 220. The second chamber 20, 120, 220 may be filled with a second fluid 24, 124, 224. The second fluid 24, 124, 224 may be a liquid. In an alternative embodiment, the method may comprise a step 50 of measuring a plurality of pressures of the compressible first fluid 22, 122, 222 in a first chamber 18, 118 over a period of time.

Pressure measurements may be performed when an electrical supply is provided to the accumulator pressure monitoring system 10. In a machine 300, electrical supply is activated at step 50 prior to engine ignition. In an embodiment, the electrical supply is provided by turning the machine 300 on before actuating engine ignition.

The method may comprise a step 52 of providing the pressure reading of the compressible first fluid 22, 122, 222 to a control unit 16. The pressure sensor 14, 114, 214 may monitor the compressible first fluid 22, 122, 222. Pressure sensor 14, 114, 214 may measure the pressure of the first fluid 22, 122, 222 and send pressure readings to the control unit 16. In an embodiment, the pressure of the compressible first fluid 22, 122, 222 may be measured upon command by the control unit 16.

The method may comprise a step 54 of comparing the pressure reading with a threshold pressure value. Control unit 16 may compare the pressure reading from the pressure sensor 14, 114, 214 to a predetermined threshold pressure value. In an alternative embodiment, step 54 may comprise comparing a plurality of pressure readings taken over a period of time to a threshold pressure value. In yet another alternative embodiment, step 54 may comprise comparing a plurality of pressure readings taken over a period of time to a plurality of threshold pressure values.

Control unit 16 may be configured to detect an abnormal pressure condition in the accumulator 12. At step 56 the control unit 16 may determine that the pressure reading is less than the threshold pressure value. Control unit 16 may detect the presence of an abnormal pressure condition in the accumulator 12. At step 58 a signal may be sent to the warning device 36 upon detection of the abnormal pressure condition. Control unit 16 may send the signal to the warning device 36 to alert the operator. The operator may take necessary precautionary measures upon receiving the alert from the warning device 36.

At step 60 the control unit 16 may determine that the pressure reading is within the required greater or equal to the threshold pressure value. In an alternative embodiment, at step 60, the control unit 16 may determine that the pressure reading is within the threshold pressure value range. Control unit 16 may not detect an abnormal pressure condition in the accumulator 12. Then at step 62 no signal may be sent to the warning device 36 and the control unit 16 registers a normal pressure check being completed.

In an embodiment, the step 50 of measuring a pressure of a compressible first fluid 22, 122, 222 in the first chamber 18, 118, 218 may be performed prior to initiation of the pump 32 for pressurising the second fluid 24, 124, 224. The pressure is measured before the engine of a machine 300 is started. In an embodiment, the second chamber 20, 120, 220 may not contain any fluid. The pump 32 may not be activated to effect flow of the second fluid 24, 124, 224 into the second chamber 20, 120, 220. The movable separator 26, 126, 226 may be pushed by the compressible first fluid 22, 122, 222 to the bottom of the second chamber 20, 120, 220. The pressure in the second chamber 20, 120, 220 may be substantially zero and the pressure in the accumulator 12 may be determined by the pressure in the first chamber first chamber 18, 118, 218.

Step 50 may be performed as a preliminary check of the pressure prior to engine initiation since a predetermined pressure is required for operation of the machine 300. In an embodiment, the pressure check prior to activation of the pump 32 may measure only the pressure of only the compressible first fluid 22, 122, 222. The operator may start the engine at step 64 if no alert is received from the warning device 36. The measurement at step 50 may be a single pressure check prior to the operation of the machine 300.

In a further embodiment, a further step 66 of measuring the pressure of a compressible first fluid 22, 122, 222 may be performed after initiation of the pump 32 for pressurising the second fluid 24, 124, 224. Upon activation, pump 32 may force the second fluid 24, 124, 224 into the second chamber 20, 120, 220. The pump 32 may be initiated at the start of an engine of a machine 300. The measurement at step 66 may be an on-going pressure check for the second fluid during the operation of the machine 300.

Engine activation may drive the pump 32 to charge the second chamber 20, 120, 220 of the accumulator 16 with second fluid 24, 124, 224 until the maximum system pressure is reached. As the second fluid 24, 124, 224 starts to flow into the second chamber 20, 120, 220, the pressure of the compressible first fluid 22, 122, 222 may rise to be equal to the pressure of the second fluid 24, 124, 224.

As the second fluid 24, 124, 224 starts to flow the movable separator 26, 126, 226 may be pushed by the second fluid 22, 122, 222 away from the bottom of the second chamber 20, 120, 220. The pressue in the accumulator 12 may be determined by the combined pressures in the first chamber 18, 118, 218 and the second chamber 20, 120, 220.

The method may comprise a step 68 of providing the pressure readings of the compressible first fluid 22, 122, 222 to the control unit 16 after initiation of the pump 32. As the pressure sensor 16 may be connected to the first chamber 18, 118, 218, the pressure of the compressible first fluid 22, 122, 222 may be continuously monitored by the pressure sensor 16 during the operation of the machine 300.

The method may return to step 54 of comparing the pressure readings with a threshold pressure value. The pressure readings may be taken after initiation of the pump 32. The threshold pressure values after the initiation of the pump 32, used by the control unit 16, may be different from the threshold pressure values prior to initiation of the pump 32.

The skilled person would appreciate that foregoing embodiments may be modified or combined to obtain the accumulator pressure monitoring system 10 of the present disclosure.

INDUSTRIAL APPLICABILITY

This disclosure describes an accumulator pressure monitoring system 10. The accumulator pressure monitoring system 10 may comprises a pressure sensor 14, 114, 214 to provide pressure checks either prior to activation of a pressure pump 32 or after the activation of the pressure pump 32. The pressure sensor 14, 114, 214 may be able to measure the compressible first fluid 22, 122, 222 pressure prior to activation of pump 32 so as to facilitate the decision to start machine operations. This pressure check is performed to assess the operational health of the accumulator 12. After the activation of pump 32 and during machine operation, the pressure sensor 14, 114, 214 may be able to detect any hydraulic component/system failure in the hydraulic circuit pressure by monitoring the pressure of the compressible first fluid 22, 122, 222.

The operations may be linked to a machine 300. The pressure of the compressible first fluid 22, 122, 222 may be measured prior to machine 300 start up. Subsequently, after machine 300 start-up, pressure of the compressible first fluid 22, 122, 222 may be monitored continuously for abnormal pressure conditions in the hydraulic fluid circuit. In the accumulator 12, 112, 212 the pressure of the compressible first fluid 22, 122, 222 may be equal to the pressure of the second fluid 24, 124, 224. The pressure of the second fluid 24, 124, 224 may be monitored by monitoring the pressure of the compressible first fluid 22, 122, 222. The accumulator pressure monitoring system 10 may process pressure readings from the pressure sensor and generate a warning upon detection of an abnormal pressure condition in either the first chamber 18, 118, 218 or the second chamber 20, 120, 220 during operation of the machine 300. The pressure sensor 14, 114, 214 may continuously monitor the oil pressure during the operation of the machine 300.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

What is claimed is:

1. An accumulator pressure monitoring system comprising:
   an accumulator having a first chamber filled with a gas, a second chamber filled with a liquid, and a movable separator disposed between the first and second chambers, the movable separator effecting a fluid seal between the first chamber and the second chamber;
   a pressure sensor fluidly coupled to the first chamber, such that the pressure sensor is in fluid communication with the first chamber, the movable separator blocking fluid communication between the pressure sensor and the second chamber; and
   a control unit operatively connected to the pressure sensor, the control unit being configured to receive pressure readings from the pressure sensor and to compare the pressure readings to threshold pressure values.

2. The accumulator pressure monitoring system of claim 1, further comprising a warning device operatively connected to the control unit,
   wherein the control unit is configured to send a signal to the warning device upon detection of an abnormal pressure condition within the accumulator.

3. The accumulator pressure monitoring system of claim 1, wherein the accumulator is a piston accumulator and the movable separator is a piston.

4. The accumulator pressure monitoring system of claim 3,
   wherein the first chamber is defined at least partly between a first end cap of the accumulator and the movable separator, and
   wherein the pressure sensor is positioned on the first end cap.

5. The accumulator pressure monitoring system of claim 1, wherein the accumulator is a bladder accumulator and the movable separator is a bladder.

6. The accumulator pressure monitoring system of claim 5, further comprising a charging conduit fluidly coupled to the first chamber,
wherein the pressure sensor is fluidly coupled to the first chamber via the charging conduit.

7. The accumulator pressure monitoring system of claim 5,
wherein the first chamber is defined at least partly between a first end cap of the accumulator and the movable separator, and
wherein the pressure sensor is positioned on the first end cap.

8. A machine comprising:
a hydraulic fluid circuit; and
an accumulator pressure monitoring system, the accumulator pressure monitoring system including:
an accumulator having a first chamber filled with a gas, a second chamber filled with a liquid, and a movable separator disposed between the first and second chambers, the movable separator effecting a fluid seal between the first chamber and the second chamber,
the second chamber being in fluid communication with the hydraulic fluid circuit, the movable separator blocking fluid communication between the first chamber and the hydraulic fluid circuit;
a pressure sensor fluidly coupled to the first chamber, such that the pressure sensor is in fluid communication with the first chamber, the movable separator blocking fluid communication between the pressure sensor and the second chamber; and
a control unit operatively connected to the pressure sensor, the control unit being configured to receive pressure readings from the pressure sensor and to compare the pressure readings to threshold pressure values.

9. A method for detecting abnormal pressure conditions in an accumulator,
the accumulator including a first chamber filled with a gas, a second chamber filled with a liquid, and a movable separator disposed between the first and second chambers, the movable separator effecting a fluid seal between the first chamber and the second chamber,
the method comprising the steps of:
measuring pressure readings of a gas in the first chamber of the accumulator via a pressure sensor, the pressure sensor being disposed in fluid communication with the first chamber, the movable separator blocking fluid communication between the pressure sensor and the second chamber;
providing the pressure readings of the gas to a control unit; and
comparing the pressure readings with threshold pressure values via the control unit.

10. The method of claim 9, wherein the step of measuring a pressure of the gas is performed prior to initiation of a pump for pressurizing the liquid.

11. The method of claim 9, wherein the step of measuring a pressure of the gas is performed after initiation of a pump for pressurizing the liquid.

12. The method of claim 10, wherein the pump is initiated at a start of an engine of a machine.

13. The method of claim 9, further comprising the step of sending a signal to a warning device upon detection of an abnormal pressure condition within the accumulator.

14. The method of claim 13, wherein the abnormal pressure condition is a pressure reading less than a threshold pressure value.

15. The method of claim 13, wherein the abnormal pressure condition is a pressure reading greater than a threshold pressure value.

* * * * *